(12) United States Patent
Taha et al.

(10) Patent No.: US 11,748,609 B2
(45) Date of Patent: Sep. 5, 2023

(54) ON-CHIP TRAINING OF MEMRISTOR CROSSBAR NEUROMORPHIC PROCESSING SYSTEMS

(71) Applicant: University of Dayton, Dayton, OH (US)

(72) Inventors: Tarek M. Taha, Centerville, OH (US); Md Raqibul Hasan, Baltimore, MD (US); Chris Yakopcic, Dayton, OH (US)

(73) Assignee: University of Dayton, Dayton, OH (US)

(*) Notice: Subject to any disclaimer, the term of this patent is extended or adjusted under 35 U.S.C. 154(b) by 437 days.

(21) Appl. No.: 17/141,981

(22) Filed: Jan. 5, 2021

(65) Prior Publication Data

US 2021/0201125 A1    Jul. 1, 2021

Related U.S. Application Data

(63) Continuation of application No. 15/202,995, filed on Jul. 6, 2016, now Pat. No. 10,885,429.

(60) Provisional application No. 62/189,026, filed on Jul. 6, 2015.

(51) Int. Cl.
   *G06N 3/065* (2023.01)
(52) U.S. Cl.
   CPC .................................... *G06N 3/065* (2023.01)
(58) Field of Classification Search
   None
   See application file for complete search history.

(56) References Cited

U.S. PATENT DOCUMENTS

| | | |
|---|---|---|
| 5,101,361 A | 3/1992 | Eberhardt |
| 7,398,259 B2 | 7/2008 | Nugent |
| 8,274,312 B2 | 9/2012 | Pino et al. |
| 2011/0004579 A1 | 1/2011 | Snider |
| 2012/0084241 A1 | 4/2012 | Friedman et al. |
| 2012/0317063 A1 | 12/2012 | Sim et al. |
| 2013/0103626 A1 | 4/2013 | Hunzinger |
| 2013/0117213 A1 | 5/2013 | Hunzinger et al. |

(Continued)

OTHER PUBLICATIONS

L. O. Chua, "Memristor—The Missing Circuit Element," IEEE Transactions on Circuit Theory, 18(5), 507-519 (1971).

(Continued)

*Primary Examiner* — Brian M Smith
(74) *Attorney, Agent, or Firm* — Taft Stettinius & Hollister LLP

(57) ABSTRACT

An analog neuromorphic circuit is disclosed having resistive memories that provide a resistance to an input voltage signal as the input voltage signal propagates through the resistive memories generating a first output voltage signal and to provide a resistance to a first error signal that propagates through the resistive memories generating a second output voltage signal. A comparator generates the first error signal that is representative of a difference between the first output voltage signal and the desired output signal and generates the first error signal so that the first error signal propagates back through the plurality of resistive memories. A resistance adjuster adjusts a resistance value associated with each resistive memory based on the first error signal and the second output voltage signal to decrease the difference between the first output voltage signal and the desired output signal.

20 Claims, 7 Drawing Sheets

(56) References Cited

U.S. PATENT DOCUMENTS

| | | | |
|---|---|---|---|
| 2013/0311413 | A1 | 11/2013 | Rose et al. |
| 2013/0325775 | A1 | 12/2013 | Sinyavskiy et al. |
| 2014/0052679 | A1 | 2/2014 | Sinyavskiy et al. |
| 2014/0122402 | A1 | 5/2014 | Bichler et al. |
| 2014/0129498 | A1 | 5/2014 | Bichler et al. |
| 2015/0178619 | A1 | 6/2015 | Nishitani |

OTHER PUBLICATIONS

D. Chabi, W. Zhao, D. Querlioz, J.-O. Klein, "Robust Neural Logic Block (NLB) Based on Memristor Crossbar Array" IEEE/ACM International Symposium on Nanoscale Architectures, pp. 137-143, 2011.

C. Zamarreño-Ramos, L. A. Camuñas-Mesa, J. A. Perez-Carrasco, T. Masquelier, T. Serrano-Gotarredona, and B. Linares-Barranco, "On spike-timing-dependent-plasticity, memristive devices, and building a self-learning visual cortex," Frontiers in Neuroscience, Neuromorphic Engineering, vol. 5, pp. 1-22, Article 26, Mar. 2011.

D. B. Strukov, G. S. Snider, D. R. Stewart, and R. S. Williams, "The missing Memristor found," Nature, 453, 80-83 (2008).

S. H. Jo, K.-H. Kim, and W. Lu, "High-Density Crossbar Arrays Based on a Si Memristive System" Nano Letters, 9(2), 2009, pp. 870-874.

G. S. Snider, "Cortical Computing with Memristive Nanodevices," SciDAC Review, (2008).

F. Alibart, E. Zamanidoost, and D.B. Strukov, "Pattern classification by memristive crossbar circuits with ex-situ and in-situ training", Nature Communications, 4:2072, Jun. 2013 (7 pages).

B. Han, and T. M. Taha, "Acceleration of spiking neural network based pattern recognition on NVIDIA graphics processors," Journal of Applied Optics, 49(101), pp. 83-91, 2010.

J. M. Nageswaran, N. Dutt, J. L. Krichmar, A. Nicolau, and A. Veidenbaum, "Efficient simulation of large-scale spiking neural networks using CUDA graphics processors," In Proceedings of the 2009 international joint conference on Neural Networks (IJCNN). IEEE Press, Piscataway, NJ, USA, 3201-3208, 2009.

T. M. Taha, P. Yalamanchili, M. Bhuiyan, R. Jalasutram, C. Chen, and R. Linderman, "Neuromorphic algorithms on clusters of PlayStation 3s," International Joint Conference on Neural Networks (IJCNN), pp. 1-10, Jul. 18-23, 2010.

P. Dubey, "Recognition, mining and synthesis moves computers to the era of tera," Technology@Intel Magazine, Feb. 2005 (10 pages).

H. Esmaeilzadeh, A. Sampson, L. Ceze, and D. Burger, "Neural Acceleration for General-Purpose Approximate Programs," International Symposium on Microarchitecture (MICRO), 2012 (11 pages).

H. Esmaeilzadeh, A. Sampson, L. Ceze, and D. Burger, "Towards Neural Acceleration for General-Purpose Approximate Computing," Workshop on Energy Efficient Design (WEED), 2012 (6 pages).

Soudry, D. et al., "Memristor-based multilayer neural networks with online gradient descent training," IEEE Trans. on Neural Networks and Learning Systems (Jan. 14, 2015) 14 pp. (Year: 2015).

ON-CHIP TRAINING OF MEMRISTOR CROSSBAR NEUROMORPHIC PROCESSING SYSTEMS

RELATED APPLICATION

The present application is a Continuation Application of U.S. Non-Provisional application Ser. No. 15/202,995 filed on Jul. 6, 2016, which claims the benefit of U.S. Provisional Patent Application No. 62/189,026 filed on Jul. 6, 2015, the disclosure of which are incorporated by reference in its entirety.

FIELD OF THE INVENTION

This invention relates to neural networks, and more particularly, to systems and methods for implementing resistive memories in an analog neuromorphic circuit.

BACKGROUND OF THE INVENTION

Traditional computing systems use conventional microprocessor technology in that operations are performed in chronological order such that each operation is completed before the subsequent operation is initiated. The operations are not performed simultaneously. For example, an addition operation is completed before the subsequent multiplication operation is initiated. The chronological order of operation execution limits the performance of conventional microprocessor technology. Conventional microprocessor design is limited in how small the microprocessors can be designed, the amount of power that the microprocessors consume, as well as the speed in which the microprocessors execute operations in chronological order. Thus, conventional microprocessor technology is proving insufficient in applications that require high computation power, such as in image recognition.

It is becoming common wisdom to use conventional neuromorphic computing networks which are laid out in a similar fashion as the human brain. Hubs of computing power are designed to function as a neuron in the human brain where different neurons of computing power are coupled to other neurons of computing power. This coupling of neurons enables the neuromorphic computing network to execute multiple operations simultaneously. Therefore, the neuromorphic computing network has exponentially more computing power than traditional computing systems.

Conventional neuromorphic computing networks are implemented in large scale computer clusters which include computers that are physically large in order to attain the computation power necessary to execute applications such as image recognition. For example, applications of these large scale computer clusters include rows and rows of physically large servers that may attain the computation power necessary to execute image recognition when coupled together to form a conventional neuromorphic computing network. Such large scale computer clusters not only take up a significant amount of physical space but also require significant amounts of power to operate.

The significant amount of physical space and power required to operate conventional neuromorphic computing networks severely limits the types of applications for which conventional neuromorphic computing networks may be implemented. For example, industries such as biomedical, military, robotics, and mobile devices are industries that cannot implement conventional neuromorphic computing networks due to the significant space limitations in such industries as well as the power limitations. Therefore, an effective means to decrease the space and the power required by conventional neuromorphic computing is needed.

SUMMARY OF THE INVENTION

The present invention provides an analog neuromorphic circuit that implements a plurality of resistive memories, a first comparator, and a resistance adjuster. A plurality of resistive memories is configured to provide a resistance to the input voltage signal as the input voltage signal propagates through the plurality of resistive memories generating a first output voltage signal. The plurality of resistive memories is also configured to provide a resistance to the first error signal that propagates through the plurality of resistive memories generating a second output voltage signal. A first comparator is configured to compare the first output voltage signal to a desired output signal. The desired output signal is a signal level that the first output voltage signal is desired to be within a threshold of the signal level. The first comparator is also configured to generate the first error signal that is representative of a difference between the first output voltage signal and the desired output signal. The first comparator is also configured to generate the first error signal so that the first error signal propagates back through the plurality of resistive memories. A resistance adjuster is configured to adjust a resistance value associated with each resistive memory based on the first error signal and the second output voltage signal to decrease the difference between the first output voltage signal and the desired output signal.

The present invention also provides a method for adjusting resistances of a plurality of resistive memories positioned in an analog neuromorphic circuit. The method starts with applying an input voltage signal of the analog neuromorphic circuit. The method further includes providing a resistance to the input voltage signal by each resistive memory as the input voltage signal propagates through the plurality of resistive memories to generate a first output voltage signal. The method further includes comparing the first output voltage signal to a desired output signal. The desired output signal is at a signal level that the first output voltage signal is desired to be within a threshold of the signal level. The method further includes a first error signal that is representative of a difference between the first output voltage signal and the desired output signal. The method further includes generating the first error signal so that the first error signal propagates back through the plurality of resistive memories. The method further includes providing a resistance to the first error signal by each resistive memory as the first error signal propagates back through the plurality of resistive memories to generate a second output voltage signal. The method further includes adjusting a resistance value associated with each resistive memory based on the first error signal and the second output voltage signal to decrease the difference between the first output voltage signal and the desired output signal.

The present invention also provides an analog neuromorphic system that implements a plurality of resistive memories, including a first analog neuromorphic circuit, a first plurality of resistive memories, a comparator, and a resistance adjuster. The first analog neuromorphic circuit includes the first plurality of resistive memories that is configured to apply a first set of weights to an input voltage signal that is generated as an output signal from another analog neuromorphic circuit as the input voltage signal propagates through the first plurality of resistive memories generating a first output voltage signal. The first set of weights is generated by resistance values applied by the first plurality of resistive memories to the input voltage signal. The first analog neuromorphic circuit is also configured to apply a second set of weights to a first error signal as the first error signal propagates back through the first plurality of resistive memories generating a second output voltage signal. The second set of weights is generated by resistance values applied by the first plurality of resistive memories. The comparator is configured to generate the first error signal that is representative of a difference between the first output voltage signal and a desired output voltage signal. The desired output voltage signal is at a signal level that the first output voltage signal is desired to be within a threshold of the signal level. The comparator is also configured to generate a second error signal that is representative of a difference between the second output voltage signal and the desired output voltage signal. The resistance adjuster is configured to adjust a resistance value associated with each resistive memory included in the first plurality of resistive memories based on the first error signal and the second error signal to decrease the difference between the first output voltage signal and the desired output signal and the difference between the second output voltage signal and the desired output signal. The resistance adjuster is also configured to provide the first error signal and the second error signal to an additional analog neuromorphic circuit.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention. Additionally, the left most digit(s) of a reference number identifies the drawing in which the reference number first appears.

DETAILED DESCRIPTION

Figure 1:
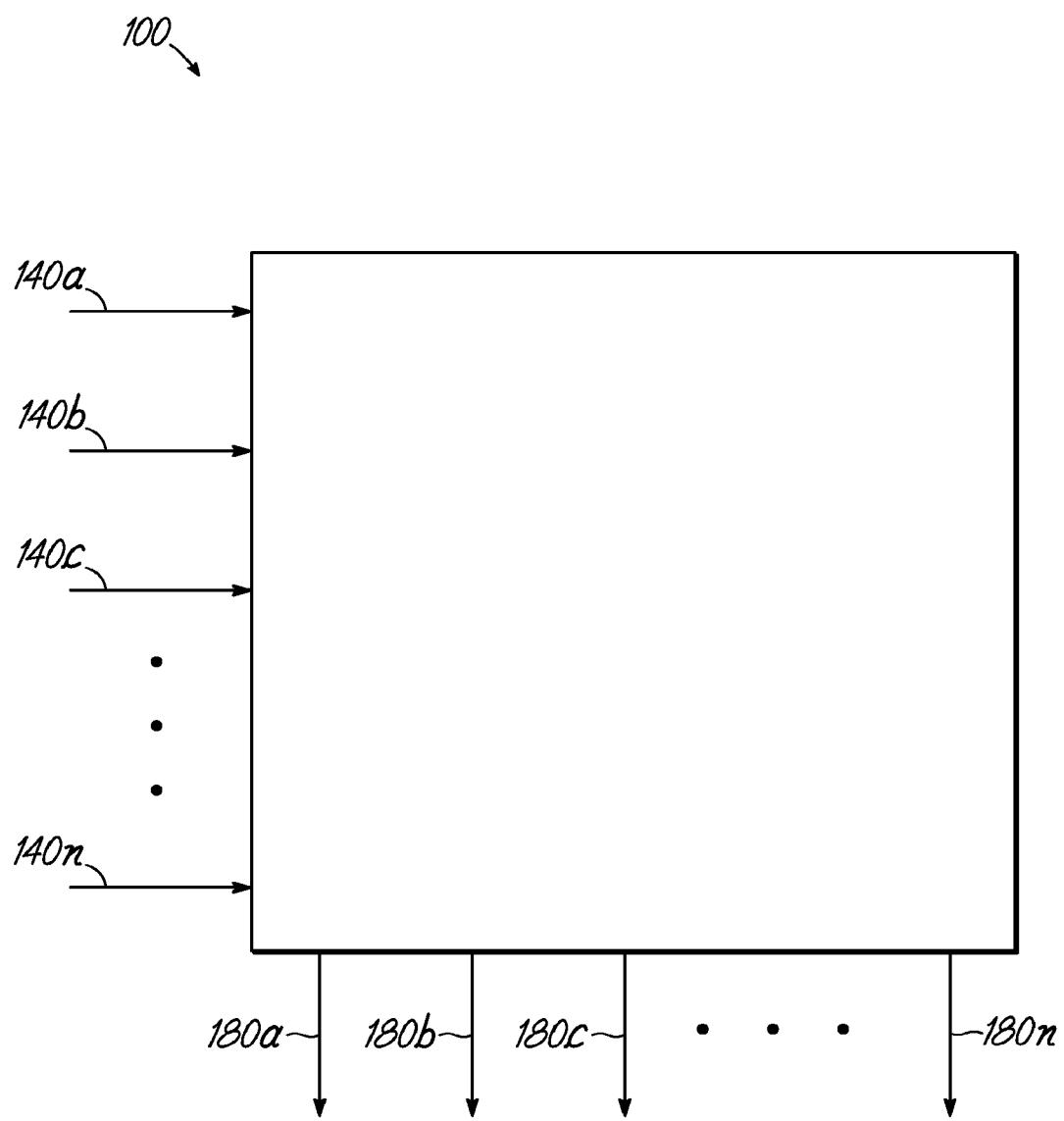
FIG. 1 is a schematic illustration of an exemplary analog neuromorphic processing device that simultaneously executes several computing operations in parallel in accordance with an embodiment of the disclosure.

The following Detailed Description refers to accompanying drawings to illustrate exemplary embodiments consistent with the present disclosure. References in the Detailed Description to "one embodiment," "an embodiment," "an exemplary embodiment," etc., indicate that the exemplary embodiment described can include a particular feature, structure, or characteristic, but every exemplary embodiment does not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other embodiments are possible, and modifications can be made to exemplary embodiments within the scope of the present disclosure. Therefore, the Detailed Description is not meant to limit the present disclosure. Rather, the scope of the present disclosure is defined only in accordance with the following claims and their equivalents.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not limitation, such that the terminology or phraseology of the present specification is to be interpreted by those skilled in relevant art(s) in light of the teachings herein.

The present invention creates an analog neuromorphic computing network by implementing resistive memories. A resistive memory is a non-volatile, variable resistor that may not only change the resistance level but may also maintain the resistance level after power to the resistive memory has been terminated so that the resistive memory acts as memory. The resistive memory may also have resistances that are positive and negative. In an embodiment, an equivalent of a negative resistance generated by a resistive memory may be generated by implementing negative weight values with a pair of resistive memories. The output of one of the resistive memories from the pair may then be inverted by an inverting circuit. Such characteristics of the resistive memory enables neuromorphic computing to be shrunk down from implementing large computers to a circuit that can be fabricated onto a chip while requiring minimal power due to the analog characteristics of the resistive memory.

The resistive memories may be positioned in a crossbar configuration in that each resistive memory is positioned at an intersection of a plurality of horizontal wires and a plurality of vertical wires forming a wire grid. An input voltage may be applied to each horizontal wire. Each resistive memory may apply a resistance to each input voltage so that each input voltage is multiplied by each resistance. The positioning of each resistive memory at each intersection of the wire grid enables the multiplying of each input voltage by the resistance of each resistive memory to be done in parallel. The multiplication in parallel enables multiple multiplication operations to be executed simultaneously. Each current relative to each horizontal wire may then be added to generate an accumulative current that is conducted by each vertical wire. The addition of each current to generate the accumulative currents is also done in parallel due to the positioning of the resistive memories at each intersection of the wire grid. The addition in parallel also enables multiple addition operations to be executed simultaneously. The simultaneous execution of addition and multiplication operations in an analog circuit generates significantly more computation power than conventional microprocessors while implementing significantly less power than conventional microprocessors.

The terms "horizontal" and "vertical" are used herein for ease of discussion to refer to one example of the invention. It should be understood however that such orientation is not required, nor is a perpendicular intersection required. It is sufficient that a plurality of parallel wires intersects a pair of parallel wires to form a crossbar or grid pattern having two wires for adding current and two or more wires for inputting voltages, with a resistive memory positioned at each intersection for multiplication. The intersections may occur at right angles (orthogonal crossing lines) or non-right angles. It may be understood, however, that the orthogonal arrangement provides the simplest means for scaling the circuit to include additional neurons and/or layers of neurons. Further, it may be understood that an orientation having horizontal rows and/or vertical columns is also simpler for scaling purposes and is a matter of the point of reference, and should not be considered limiting. Thus, any grid configuration orientation is contemplated.

Referring to FIG. 1, an analog neuromorphic processing device 100 simultaneously executes several computing operations in parallel. The analog neuromorphic processing device 100 includes a plurality of input voltages 140(*a-n*) that are applied to a plurality of respective inputs of the analog neuromorphic processing device 100 and the analog neuromorphic processing device 100 then generates a plurality of output signals 180(*a-n*).

The analog neuromorphic processing device 100 may include a plurality of resistive memories (not shown) that have variable resistance characteristics that may be exercised not only with low levels of power but may also exercise those variable resistance characteristics after power applied to the resistive memories has been terminated. The variable resistance characteristics of the resistive memories enable the resistive memories to act as memory while maintaining significantly low power requirements compared to conventional microprocessors. The resistive memories are also of nano-scale sizes that enable a significant amount of resistive memories to be configured within the analog neuromorphic processing device 100 while still maintaining significantly low power level requirements. The variable resistance capabilities of the resistive memories coupled with the nano-scale size of the resistive memories enable the resistive memories to be configured so that the analog neuromorphic processing device 100 has significant computational efficiency while maintaining the size of the analog neuromorphic processing device 100 to a chip that may easily be positioned on a circuit board.

For example, the resistive memories may include but are not limited to memristors that are nano-scale variable resistance devices with a significantly large variable resistance range. The physics of the resistive memories, such as memristors, require significantly low power and occupy little space so that the resistive memories may be configured in the analog neuromorphic processing device 100 to generate significant computational efficiency from a small chip.

The plurality of input voltages 140(a-n), where n is an integer greater than or equal to one, may be applied to corresponding inputs of the analog neuromorphic processing device 100 to exercise the variable resistance characteristics of the resistive memories. The input voltages 140(a-n) may be applied at a voltage level and for a time period that is sufficient to exercise the variable resistance characteristics of the resistive memories. The input voltages 140(a-n) may vary and/or be substantially similar depending on the types of variable resistance characteristics that are to be exercised by each of the resistive memories.

The resistive memories may be arranged in the analog neuromorphic processing device 100 such that the resistive memories may simultaneously execute multiple addition and multiplication operations in parallel in response to the input voltages 140(a-n) being applied to the inputs of the analog neuromorphic processing device 100. The variable resistance characteristics of the resistive memories as well as their nano-scale size enables a significant amount of resistive memories to be arranged so that the input voltages 140(a-n) trigger responses in the resistive memories that are then propagated throughout the analog neuromorphic processing device 100 that results in simultaneous multiplication and addition operations that are executed in parallel.

The simultaneous multiplication and addition operations executed in parallel exponentially increase the efficiency of analog neuromorphic processing device 100 while limiting the power required to obtain such computation capabilities to the input voltages 140(a-n). The resistive memories are passive devices so that the simultaneous multiplication and addition operations executed in parallel are performed in the analog domain, which also exponentially decreases the required power. For example, the analog neuromorphic processing device 100 may have significantly more computational efficiency than traditional microprocessor devices, and may be smaller than traditional microprocessor chips while reducing power in a range from 1,000 times to 1,000,000 times that of traditional microprocessors.

The resistive memories may also be arranged such that the simultaneous execution of the multiplication and addition operations in parallel may be configured as a single computation hub that constitutes a single neuron in a neural network. The variable resistance characteristics and the nano-scale size of the resistive memories further enable the arrangement of resistive memories to be scaled with other arrangements of resistive memories so that the single neuron may be scaled into a neural network including multiple neurons. The scaling of a single neuron into multiple neurons exponentially further increases the computational efficiency of the resulting neural network. In addition, the multiple neurons may be scaled into several layers of neurons that further exponentially increases the computational efficiency of the neural network. The scaling of the resistive memories into additional neurons may be done within the analog neuromorphic processing device 100 such as within a single chip. However, the analog neuromorphic processing device 100 may also be scaled with other analog neuromorphic circuits contained in other chips to exponentially increase the computational efficiency of the resulting neural network.

As a result, the analog neuromorphic processing device 100 may be configured into a neural network that has the capability of executing applications with significant computational efficiency, such as image recognition. For example, the output signals 180(a-n), where n is an integer greater than or equal to one, may generate signals that correctly identify an image. The analog neuromorphic processing device 100 may also have the learning capability as will be discussed in further detail below so that analog neuromorphic circuits may successfully execute learning algorithms.

The analog neuromorphic processing device 100 implemented as a single neuron and/or multiple neurons in a neural network and/or configured with other similar analog neuromorphic processing devices 100 may have significant advantages in traditional computing platforms that require significant computational efficiency with limited power resources and space resources. For example, such traditional computing platforms may include but are not limited to Fast Fourier Transform (FFT) applications, Joint Photographic Experts Group (JPEG) image applications, and/or recognition, mining, and synthesis (RMS) applications. The implementation of low power neural networks that have a limited physical footprint may also enable this type of computational efficiency to be utilized in many systems that have traditionally not been able to experience such computational efficiency due to the high power consumption and large physical footprint of conventional computing systems. Such systems may include but are not limited to military and civilian applications in security (image recognition), robotics (navigation and environment recognition), and/or medical applications (artificial limbs and portable electronics).

The layering of the analog neuromorphic processing device 100 with other similar analog neuromorphic circuits may enable complex computations to be executed. The compactness of the resistive memory configurations enables fabrication of chips with a high synaptic density in that each chip may have an increased amount of neurons that are fitted onto the chip. The passive characteristics of the resistive memories eliminate the need for software code which increases the security of the analog neuromorphic processing device 100.

Figure 2:
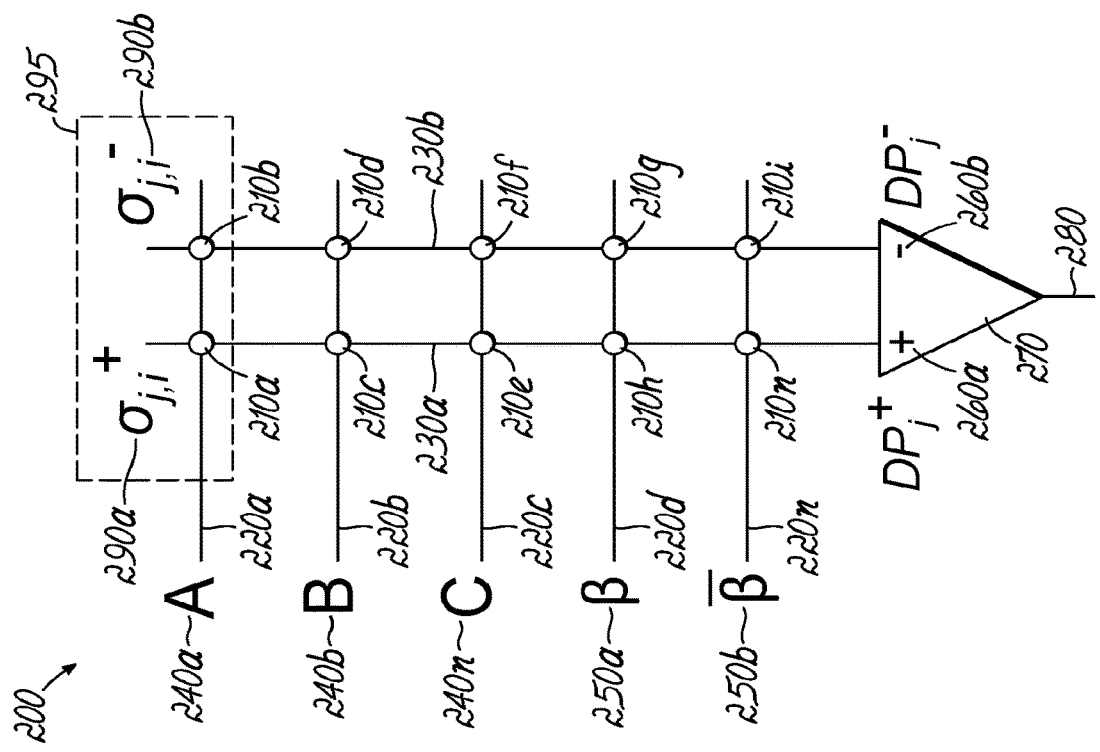
FIG. 2 is a schematic illustration of an exemplary analog neuromorphic circuit that simultaneously executes several computing operations in parallel in accordance with an embodiment of the disclosure.

Referring to FIG. 2, an analog neuromorphic circuit 200 simultaneously executes several computing operations in parallel. The analog neuromorphic circuit 200 includes a plurality of resistive memories 210(a-n) where n is an integer equal to or greater than four, a plurality of horizontal wires 220(a-n) where n is an integer equal to or greater than two, a pair of vertical wires 230(a-b), a plurality of input voltages 240(a-n) where n is an integer equal to or greater than two, a pair of bias voltage connections 250(a-b), a first and second input of a comparator 260(a-b), a comparator 270, an output of the comparator 280, a pair of weights 290(a-b), and a combined weight 295. The analog neuromorphic circuit 200 shares many similar features with the analog neuromorphic processing device 100; therefore, only the differences between the analog neuromorphic circuit 200 and the analog neuromorphic processing device 100 are to be discussed in further detail.

The analog neuromorphic circuit 200 may be representative of a single neuron of a neural network. The analog neuromorphic circuit 200 has the capability to be scaled to interact with several other analog neuromorphic circuits so that multiple neurons may be implemented in the neural network as well as creating multiple layers of neurons in the neural network. Such a scaling capability to include not only multiple neurons but also multiple layers of neurons significantly magnifies the computational efficiency of the neural network, as will be discussed in further detail below.

The resistive memories 210(a-n) may be laid out in a crossbar configuration that includes a high density wire grid. The crossbar configuration enables the resistive memories 210(a-n) to be tightly packed together in the wire grid as will be discussed in further detail below. The tightly packed resistive memories 210(a-n) provides a high density of resistive memories 210(a-n) in a small surface area of a chip such that numerous analog neuromorphic circuits may be positioned in a neural network on a chip while occupying little space. The crossbar configuration also enables the resistive memories 210(a-n) to be positioned so that the analog neuromorphic circuit 200 may execute multiple addition and multiplication operations in parallel in the analog domain. The numerous neuromorphic circuits may then be positioned in the neural network so that the multiple addition and multiplication operations that are executed in parallel may be scaled significantly, thus exponentially increasing the computational efficiency. The resistive memories 210(a-n) are passive devices so that the multiple addition and multiplication operations executed in parallel are done in the analog domain, which also exponentially decreases the required power.

As a result, the analog neuromorphic circuits that are configured into a neural network have the capability of executing applications requiring significant computation power, such as image recognition. The analog neuromorphic circuits also have learning capability as will be discussed in further detail below so that the analog neuromorphic circuits may successfully execute learning algorithms.

Figure 3:
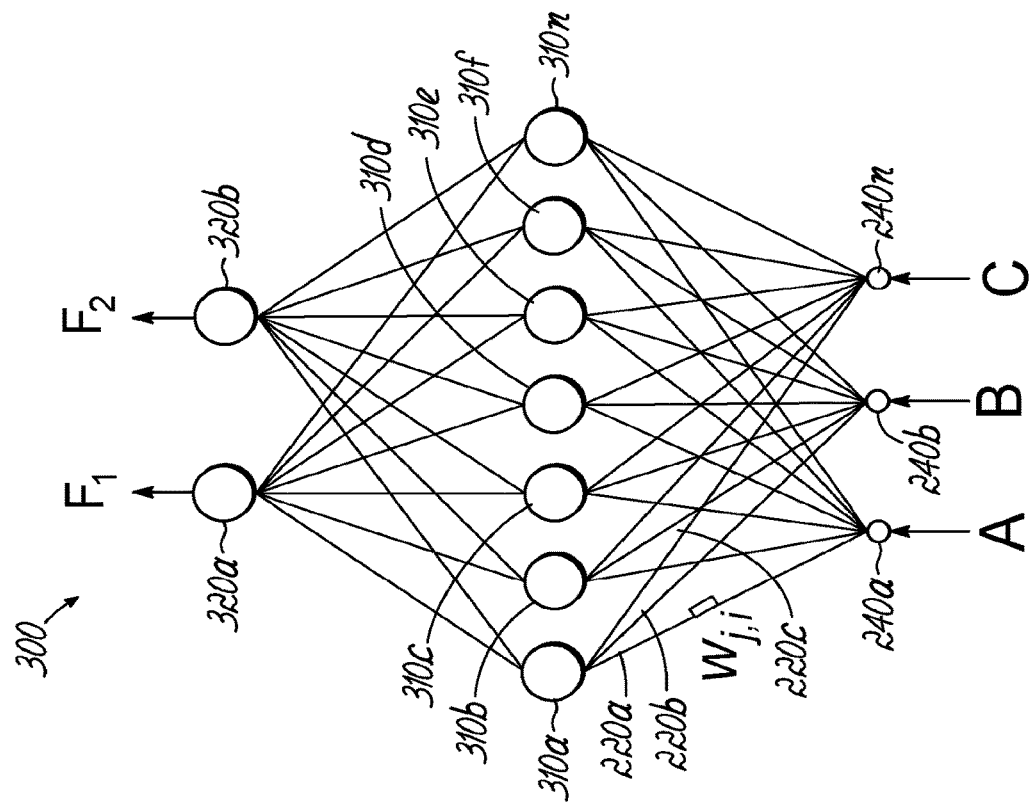
FIG. 3 is a schematic illustration of an exemplary neural network configuration that the analog neuromorphic circuit of FIG. 1 may be implemented and scaled in accordance with an embodiment of the disclosure.

Referring to FIG. 3, in which like reference numerals are used to refer to like parts, neural network configuration 300 that the analog neuromorphic circuit 200 may be implemented and scaled into is shown. The neural network configuration 300 shares many similar features with the analog neuromorphic processing device 100 and the analog neuromorphic circuit 200; therefore, only the differences between the neural network configuration 200 and the analog neuromorphic processing device 100 and the analog neuromorphic circuit 200 are to be discussed in further detail.

The analog neuromorphic circuit 200 may be implemented into the neural network configuration 300. The analog neuromorphic circuit 200 may constitute a single neuron, such as neuron 310a in the neural network configuration 300. As shown in FIG. 3, the input voltage 240a and represented by "A" is applied to the horizontal wire 220a, the input voltage 240b and represented by "B" is applied to the horizontal wire 220b, and the input voltage 240n and represented by "C" is applied to the horizontal wire 220c. The combined weight 295 as shown in FIG. 2 as representative of the combined weight for the input voltage 240a is shown as $W_{j,i}$ in FIG. 3. Similar combined weights for the input voltage 240b and the input voltage 240n may also be represented in FIG. 3 in a similar fashion. The wire grid, the resistive memories 210(a-n), and the comparator 270 are represented by the neuron 310a. The output 280 of the analog neuromorphic circuit 200 is coupled to additional neurons 320a and 320b.

The analog neuromorphic circuit 200 may then be scaled so that similar circuits may be configured with the analog neuromorphic circuit 200 to constitute additional neurons, such as neurons 310(b-n) where n is an integer greater than or equal to two. Each of the other neurons 310(b-n) includes similar circuit configurations as the analog neuromorphic circuit 200. However, the resistances of the resistive memories associated with each of the other neurons 310(b-n) may differ from the analog neuromorphic circuit 200 so that outputs that differ from the output 280 of the analog neuromorphic circuit 200 may be generated.

Rather than limiting the input voltages 240(a-n) to be applied to a single neuron 310, the input voltages 240(a-n) may also be applied to multiple other neurons 310(b-n) so that each of the additional neurons 310(b-n) also generate outputs that differ from the output 280 generated by the analog neuromorphic circuit 200. The generation of multiple different outputs from the different neurons 310(a-n) exponentially increases the computational efficiency of the neural network configuration 300. As noted above, the analog neuromorphic circuit 200 represented by the neuron 310a operates as a single logic function with the type of logic function being adjustable. The addition of neurons 310(b-n) provides additional logic functions that also have the capability of their logic functions being adjustable so that the computational efficiency of the neural network configuration 300 is significant.

In addition to having several different neurons 310(a-n), the analog neuromorphic circuit 200 may also be scaled to include additional layers of neurons, such as neurons 320(a-b). The scaling of additional layers of neurons also exponentially increases the computational efficiency of the neural network configuration 300 to the extent that the neural network configuration 300 can execute learning algorithms. For example, a neural network configuration with a significant number of input voltages, such as several hundred, that are applied to a significant number of neurons, such as several hundred, that have outputs that are then applied to a significant number of layers of neurons, such as hundreds, may be able to execute learning algorithms. The repetitive execution of the learning algorithms by the extensive neural network configuration may result in the neural network configuration eventually attaining automatic image recognition capabilities.

For example, the neural network configuration may eventually output a high voltage value of "$F_1$" representative of the binary signal "1" and output a low voltage value of "$F_2$" representative of the binary signal "0" when the neural network configuration recognizes an image of a dog. The neural network configuration may then output a low voltage value of "$F_1$" representative of the binary signal "0" and output a high voltage value of "$F_2$" representative of the binary signal "1" when the neural network configuration recognizes an image that is not a dog.

However, the neural network configuration 300 does not automatically output a binary signal "1" for "$F_1$" and a binary signal "0" for "$F_2$" when the neural network configuration 300 recognizes an image of a dog. The neural network configuration 300 may have to execute learning algorithms in millions of iterations until the resistance values of each memristor included in the neural network configuration 300 is at a value so that the neural network configuration 300 outputs a binary signal "1" for "$F_1$" and a binary signal "0" for "$F_2$" when the neural network configuration 300 recognizes the image of a dog.

Figure 4B:
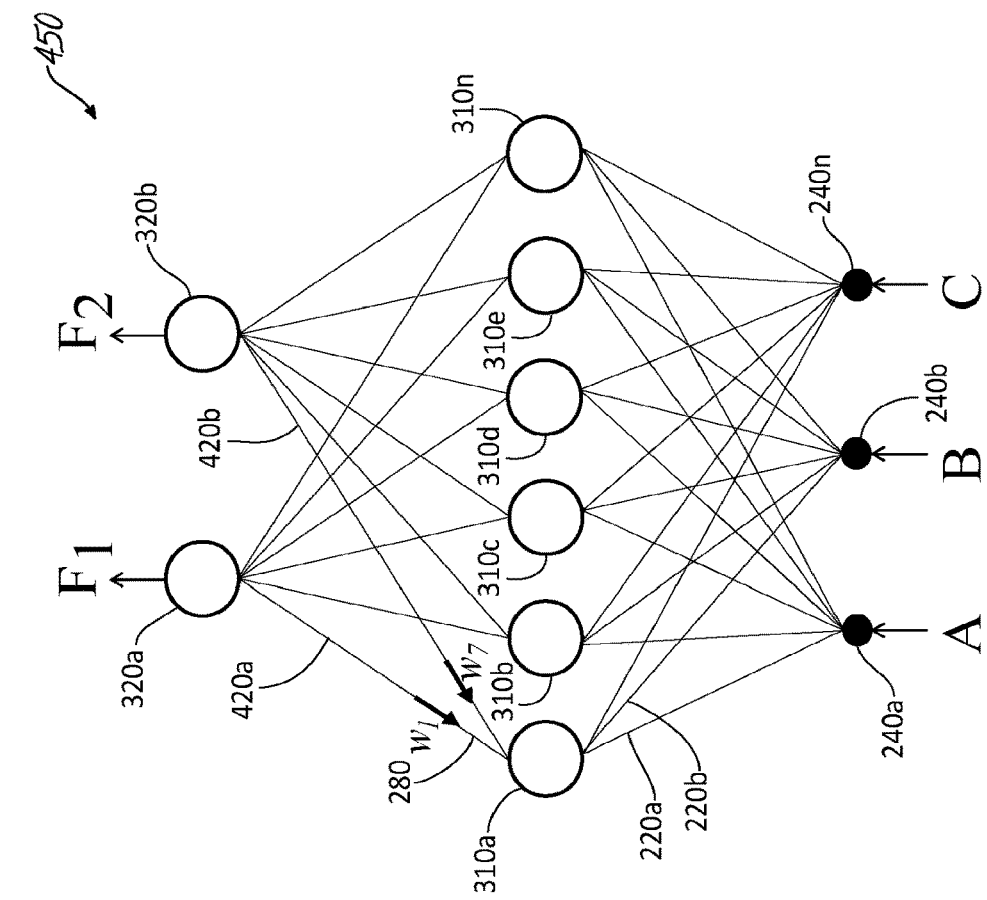
FIG. 4B is a schematic illustration of an exemplary neural network configuration that details how the weights of such an exemplary neural network configuration are propagated back through the neural network configuration when executing a back propagation training algorithm in accordance with an embodiment of the disclosure.
Figure 4A:
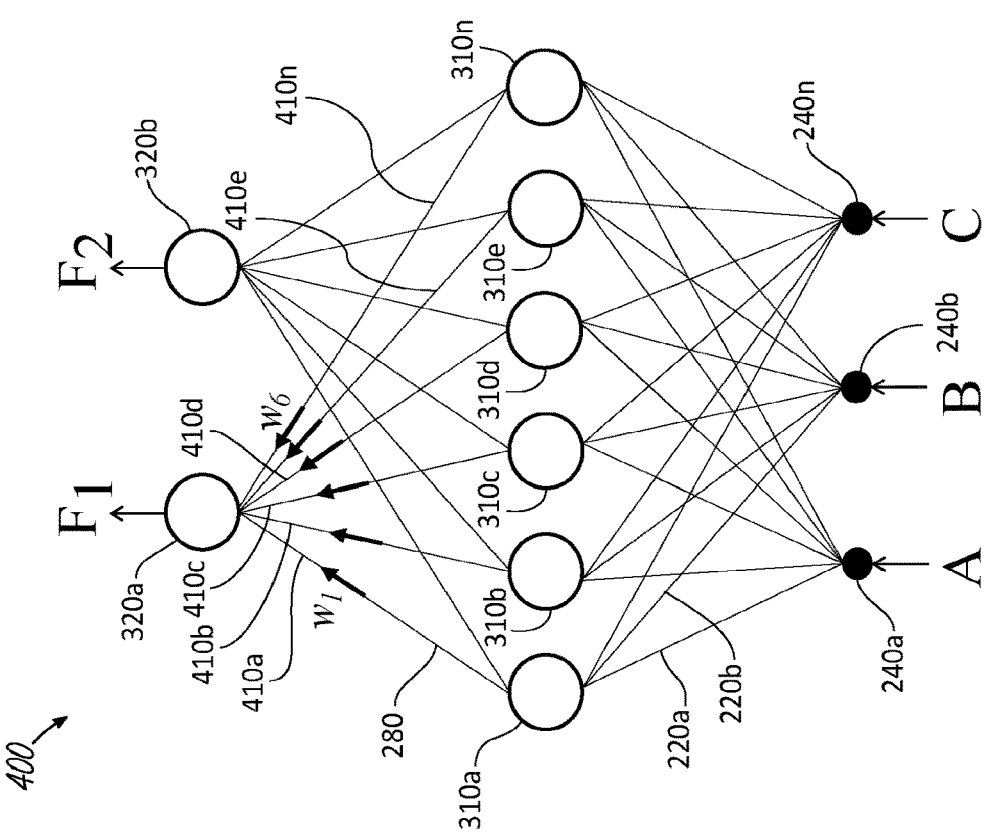
FIG. 4A is a schematic illustration of an exemplary neural network configuration that details how the weights of such an exemplary neural network configuration are applied when executing a back propagation training algorithm in accordance with an embodiment of the disclosure.

In an embodiment, neural network configuration 300 executes a back propagation training algorithm in which the output voltage values of "$F_1$" and "$F_2$" of neurons 320(a-b), respectively after each iteration, are then "propagated back" to neurons 310(a-n). Referring to FIGS. 4A and 4B, in which like reference numerals are used to refer to like parts, neural network configurations 400 and 450 in which the back propagation training algorithm may be executed with is shown. The neural network configurations 400 and 450 share many similar features with the neural network configuration 300, the analog neuromorphic circuit 200, and the analog neuromorphic processing device 100; therefore, only the differences between the neural network configurations 400 and 450 and the neural network configuration 300, the analog neuromorphic circuit 200, and the analog neuromorphic processing device 100 are to be discussed in further detail.

As mentioned above, known input voltages 240(a-n) as represented by "A", "B", and "C" are applied to neurons 310(a-n). In a simplified example, a displayed image of a dog may generate known input voltages 240(a-n) that are applied to neurons 310(a-n). In such a simplified example, the known input voltage 240a applies a binary signal of "1" to input "A", the known input voltage 240b applies a binary signal of "0" to input "B", and the known input voltage 240n applies a binary signal of "0" to input "C" after engaging an image of a dog. However, a more realistic example would require significantly more input voltages than three input voltages to reasonably represent a dog. This example discusses three input voltages out of simplicity with regards to representing a dog out of simplicity. The neural network configuration 400 must generate the appropriate corresponding output voltage values of "$F_1$" and "$F_2$" to correctly identify the image as displaying a dog after the input voltages 240(a-n) are applied to neurons 310(a-n). The desired output voltage values of "$F_1$" and "$F_2$" that are necessary to correctly identify the image as displaying a dog may be known. For example, the binary signal of "1" for "$F_1$" and the binary signal of "0" for "$F_2$" may be a required output for the neural network configuration 400 to properly identify an image as displaying a dog.

The actual output voltage values of "$F_1$" and "$F_2$" for neurons 320(a-b) after the known input voltage values of "A", "B", and "C" are applied to neurons 310(a-n) are unknown. The input voltage values of "A", "B", and "C" are applied to the memristors included in each of the neurons 310(a-n) with each memristor having a resistance value. Weights 410(a-n) as contained in the resistor values of each memristor included in neurons 310(a-n) are then exercised when the input voltage values of "A", "B", and "C" are applied to the resistor values of each memristor included in neurons 310(a-n). The weights 410(a-n) then generate the output voltage value of "$F_1$". The output voltage value of "$F_2$" is generated in a similar fashion. Thus, the output voltage values of "$F_1$" and "$F_2$" may be a direct correlation to the resistor values of the memristors included in neurons 310(a-n).

Often times, the output voltage values of "$F_1$" and "$F_2$" differ from the desired output voltages after the input voltage values of "A", "B", "C" are applied such that the neural network configuration 400 fails to execute the appropriate task, such as identifying the image as displaying a dog. For example, the input voltage values of "1" for "A", "0" for "B", and "0" for "C" results in an output voltage value of "0" for "$F_1$" and "1" for "$F_2$". In this example, the known desired output voltage value for "$F_1$" is "1" and "0" for "$F_2$" so that the image is correctly identified as displaying a dog. As a result, the actual output voltage values of "0" for "$F_1$" and "1" for "$F_2$" differ from the desired output voltage values of "1" for "$F_1$" and "0" for "$F_2$".

The actual output voltage values for "$F_1$" and "$F_2$" may be compared to the desired output voltage values to generate an error output voltage value. In an embodiment, the actual output voltage values may be subtracted from the desired output voltage values to generate the error output voltage values. In this example, the actual output voltage value of "0" for "$F_1$" is subtracted from the desired output value of "1" to generate an error output voltage value of "1". The actual output voltage value of "1" for "$F_2$" is subtracted from the desired output value of "0" to generate an error output voltage value of "−1". The comparing of the actual output voltage values from the desired output voltage values may be executed via subtracting the actual output voltage value from the desired output voltage value and/or any other comparing technique that may determine the error output voltage value as would be appreciated by one skilled in the art.

With the error output voltages known for "$F_1$" and "$F_2$", the weights associated with neurons 320(a-b) may be updated accordingly in an attempt to rectify the error output voltages generated for "$F_1$" and "$F_2$". For example, the resistance values of the memristors included in neuron 320a may be adjusted to rectify the error output voltage of "1" for "$F_1$" and the resistance values of the memristors included in neuron 320b may be adjusted to rectify the error output voltage of "−1" for "$F_2$". The resistance values of the memristors included in neuron 320a may be adjusted so that the output voltage value of "$F_2$" is eventually substantially equal to the desired output voltage value of "1" and the resistance values of the memristors included in neuron 320b may be adjusted so that the output voltage of "$F_2$" is eventually substantially equal to the desired output voltage value of "0" so that the neural network configuration 400 eventually correctly identifies the image as displaying the dog.

After the resistance values of the memristors included in the neurons 320(a-b) have been adjusted, the error output voltage value of "1" for "$F_1$" may then be applied to neuron 320a and the error output voltage value of "−1" for "$F_2$" may then be applied to neuron 320b as shown with neural network configuration 450 in FIG. 4B. In applying the error output voltage values for "$F_1$" and "$F_2$" to neurons 320(a-b), respectively, the error output voltage values are then propagated back through neural network configuration 450. The error output voltage values of "$F_1$" and "$F_2$" are applied to the memristors with the adjusted resistor values. Weights 420(a-b) which differ from weights 410(a-n) are then generated from the error output voltage values of "$F_1$" and "$F_2$" being applied to the adjusted resistor values of each memristor included in neurons 320(a-b). The weights 420(a-b) then generate the propagated output voltage value of "A". The propagated output voltage values of "B" and "C" are generated in a similar fashion. Thus, the propagated output voltage values of "A", "B" and "C" may be a direct correlation to the adjusted resistor values of the memristors included in neurons 320(a-b).

The propagated output values of "A", "B" and "C" may then be compared to the desired output voltage values of "$F_1$" and "$F_2$" to generate additional error output voltages. The resistance values of the memristors included in neurons 310(a-n) may then be adjusted in a similar fashion as the memristors included in neurons 320(a-b) based on the error output voltages. The propagation of error voltages through the neural network configuration 450 may then continue through several iterations until the output voltage values of "$F_1$" and "$F_2$" are substantially equivalent to the desired output voltage values such that the neural network configuration 450 may correctly identify the image as displaying a dog.

Figure 5:
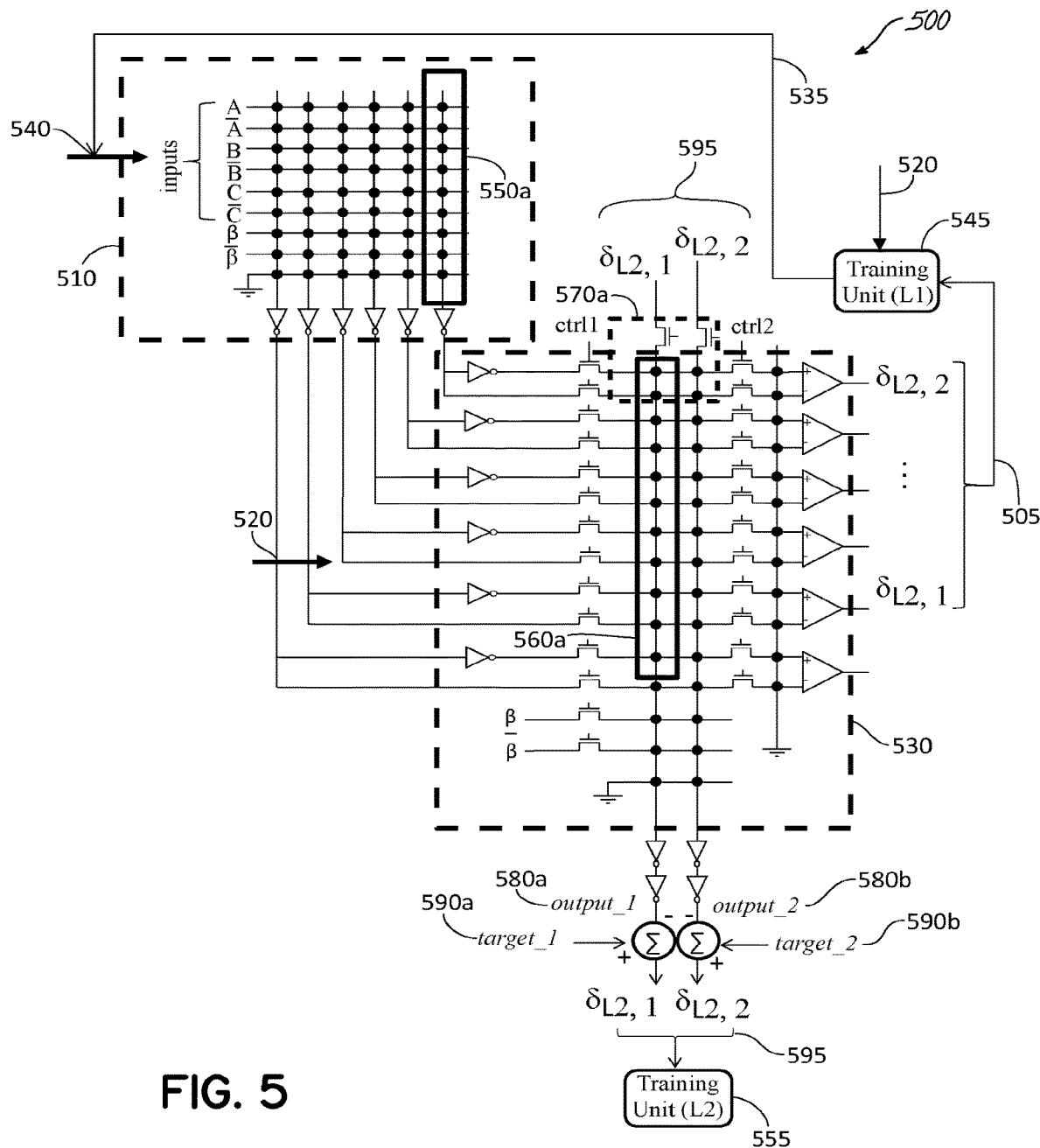
FIG. 5 is a schematic illustration of an exemplary neural network configuration implementing a first and second crossbar configuration in accordance with an embodiment of the disclosure.

Referring to FIG. 5, in which like reference numerals are used to refer to like parts, a detailed neural network configuration 500 implementing analog neuromorphic circuits similar to the analog neuromorphic circuit 200 is shown. The neural network configuration 500 shares many similar features with the analog neuromorphic circuit 200, the neural network configurations 300, 400, and 450, and the neuromorphic processing device 100; therefore, only the differences between the neural network configuration 500 and the analog neuromorphic circuit 200, the neural network configurations 300, 400 and 450, and the neuromorphic processing device 100 are to be discussed in further detail.

The neural network configuration 500 includes a first memristor crossbar configuration 510. The first memristor crossbar configuration 510 includes a plurality of vertical neuron configurations, such as vertical neuron configuration 550a. An example of a vertical neuron configuration is analog neuromorphic circuit 200 shown in FIG. 2. The vertical neuron configurations included in the first memristor crossbar configuration 510 may represent neurons 310(a-n) as discussed in FIGS. 3, 4A, and 4B. An initial input voltage signal 540 may be applied to the input of the first memristor crossbar configuration 510 as discussed in detail with regards to the input voltages 240(a-n) being applied to neurons 310(a-n) in the neural network configuration 400 shown in FIG. 4A. The initial input voltage signal 540 may then propagate through the memristors included in the first memristor crossbar configuration 510 in which the resistance values in each of the memristors represent weights used to generate a set of output voltages which may then be applied as an input voltage signal 520 to a second memristor crossbar configuration 530.

The second memristor crossbar configuration 530 includes both a vertical neuron configuration 560a as well as a plurality of horizontal neuron configurations, such as horizontal neuron configuration 570a. The vertical neuron configuration 560a as well as the plurality of horizontal neuron configurations may represent neurons 320(a-b) as discussed in FIGS. 3, 4A, and 4B. As the input voltage signal 520 is applied to the second memristor crossbar configuration 530, the input voltage signal 520 propagates through the vertical neuron configuration 560a in which the resistance values of the memristors included in the vertical neuron configuration 560a generate a first output voltage signal 580a. The first output voltage signal 580a may represent the output voltage values of "$F_1$" and "$F_2$" as discussed in FIGS. 3, 4A, and 4B. The first output voltage signal 580a may then be compared to a desired output signal 590a to generate a first error signal 595. The comparison of the first output voltage signal 580a to the desired output signal 590a to generate the first error signal 595 may be done in a similar fashion as the output voltage values "$F_1$" and "$F_2$" are compared to the desired output voltage value to generate the error voltage value as discussed in FIGS. 3, 4A, and 4B. The first error signal 595 is then propagated back through the second memristor crossbar configuration 530 as discussed in detail with regards to the neural network configuration 450 in FIG. 4B.

In propagating back through the second memristor crossbar configuration 530, the first error signal 595 may then be applied to the second memristor crossbar configuration 530. The first error signal 595 may propagate through the plurality of horizontal neuron configurations, such as horizontal neuron configuration 570a, in which the resistance values of the memristors included in the plurality of horizontal neuron configurations generate a second output voltage signal 505. The second output voltage signal 505 may then be compared to the input voltage signal 520 to generate a second error signal 535. As shown in FIG. 5, the second error signal 535 is then applied to the first memristor crossbar configuration 510 as the initial input voltage signal 540.

In propagating the first error signal 595 back through the second memristor crossbar configuration 530 as well as propagating the second error signal 535 back through the first memristor crossbar configuration 510, the resistance values for each memristor included in the first memristor crossbar configuration 510 and the second memristor crossbar configuration 530 may be adjusted accordingly. The resistance values for each memristor may be adjusted such that following each of the iterations in generating the first error signal 595 and the second error signal 535, the magnitudes of the first error signal 595 and the second error signal 535 are decreased. After several iterations of adjusting the resistance values for each memristor, the magnitudes of the first error signal 595 and the second error signal 535 may be decreased sufficiently such that the first output voltage signals 580(a-b) of the second memristor crossbar configuration 530 are within thresholds the desired output signals 590(a-b). The convergence of the first output voltage signals 580(a-b) to the desired output signals 590(a-b) may indicate that the neural network configuration 500 accurately executes the required task, such as identifying an image that is displaying a dog. The functionality of the neural network configuration 500 may be discussed in further detail below.

Figure 6B:
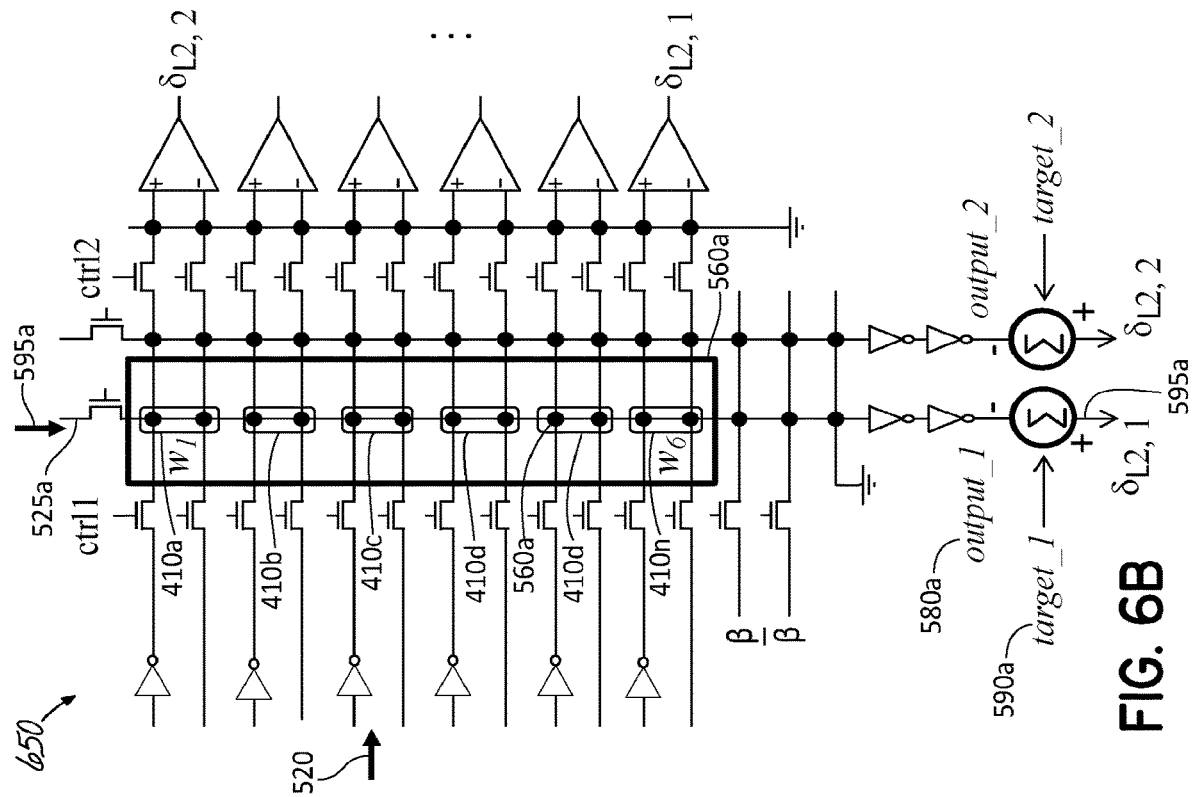
FIG. 6B is a schematic illustration of an exemplary neural network configuration with regards to a vertical neural network configuration being implemented in the second crossbar configuration in accordance with an embodiment of the disclosure.
Figure 6A:
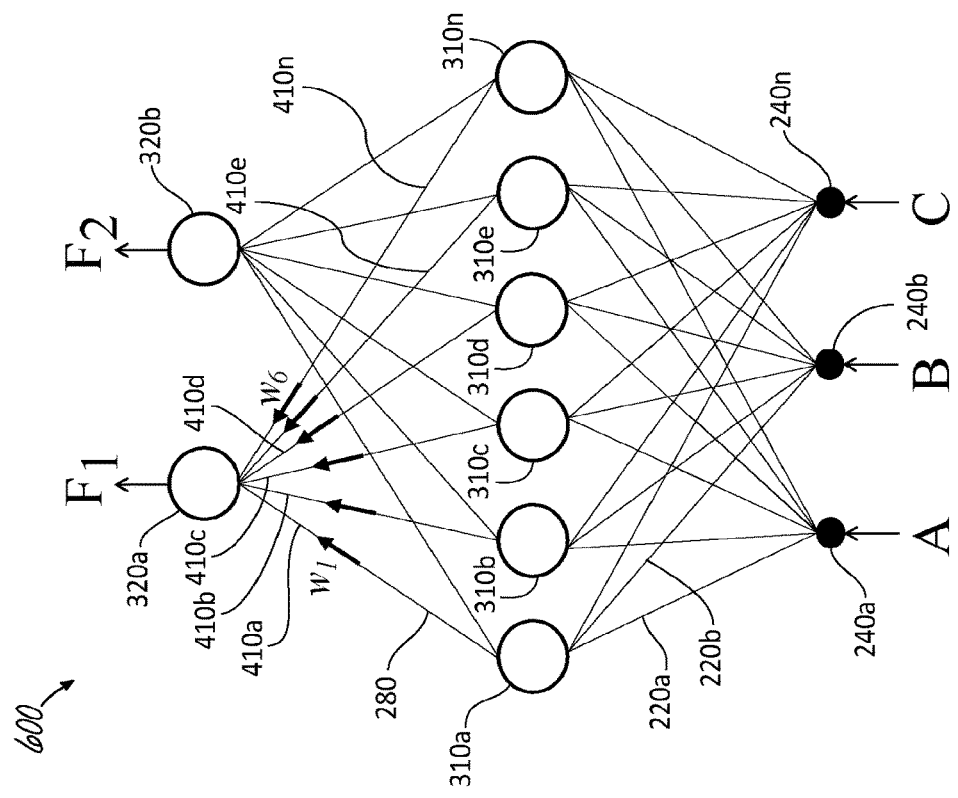
FIG. 6A is a schematic illustration of an exemplary neural network configuration that details how the weights of such an exemplary neural network configuration are applied when executing a back propagation training algorithm in accordance with an embodiment of the disclosure.

Referring to FIGS. 6A and 6B, the functionality of the vertical neural network configuration 560a as discussed in FIG. 5 with regards to the discussion of the neural network configuration 400 as discussed in FIG. 4A is presented in further detail below for clarity. The neural network configuration 600 as presented in FIG. 6A includes the similar features as the neural network configuration 400 as presented in FIG. 4A. The second memristor crossbar configuration 650 as presented in FIG. 6B includes the similar features as the second memristor crossbar configuration 530 as presented in FIG. 5 in which the functionality of the vertical neural network configuration 560a is discussed in further detail.

The input voltage signal 520 generated by the first memristor crossbar configuration 510 is applied to a horizontal input of the second memristor crossbar configuration 650 similar to the input voltages 240(a-n) being applied to neurons 310(a-n) in FIG. 6A. The horizontal input is the input of the second memristor crossbar configuration 650 that is coupled to the output of the first memristor crossbar configuration 510. The input voltage signal 520 then propagates through the vertical neural network configuration 560a. As the input voltage signal 520 propagates through the vertical neural network configuration 560a, the weights 410(a-n) as represented by the resistance values of each memristor included in the vertical neural network configuration 560a are exercised when the input voltage signal 520 is applied to the neural network configuration 560a as in FIG. 6A. The weights 410(a-n) then generate the first output voltage signal 580a which is similar to the output voltage value of "$F_1$" in FIG. 6A. Thus, the first output voltage signal 580a may be a direct correlation to the resistance values of the memristors included in the vertical neural network configuration 560a.

The first output voltage signal 580a may then be compared to the desired output signal 590a. As discussed above, the desired output signal 590a may be the signal required so that the task may be appropriately executed, such as identifying an image displaying a dog. The comparisons of the first output voltage signal 580a to the desired output signal 590a generates the first error signal 595a in which the first error signal 595a may be the difference between the desired output signal 590a and the first output voltage signal 580a. As noted above, the weights associated with the neurons included in the second memristor crossbar configuration 650 may be updated accordingly in an attempt to rectify the first error signal 595a so that the first error signal 595a is within a threshold of the desired output signal 590a. The threshold from the desired output signal 590a may be an adequate threshold such that the task may be appropriate executed, such as identifying an image displaying a dog.

Figure 7B:
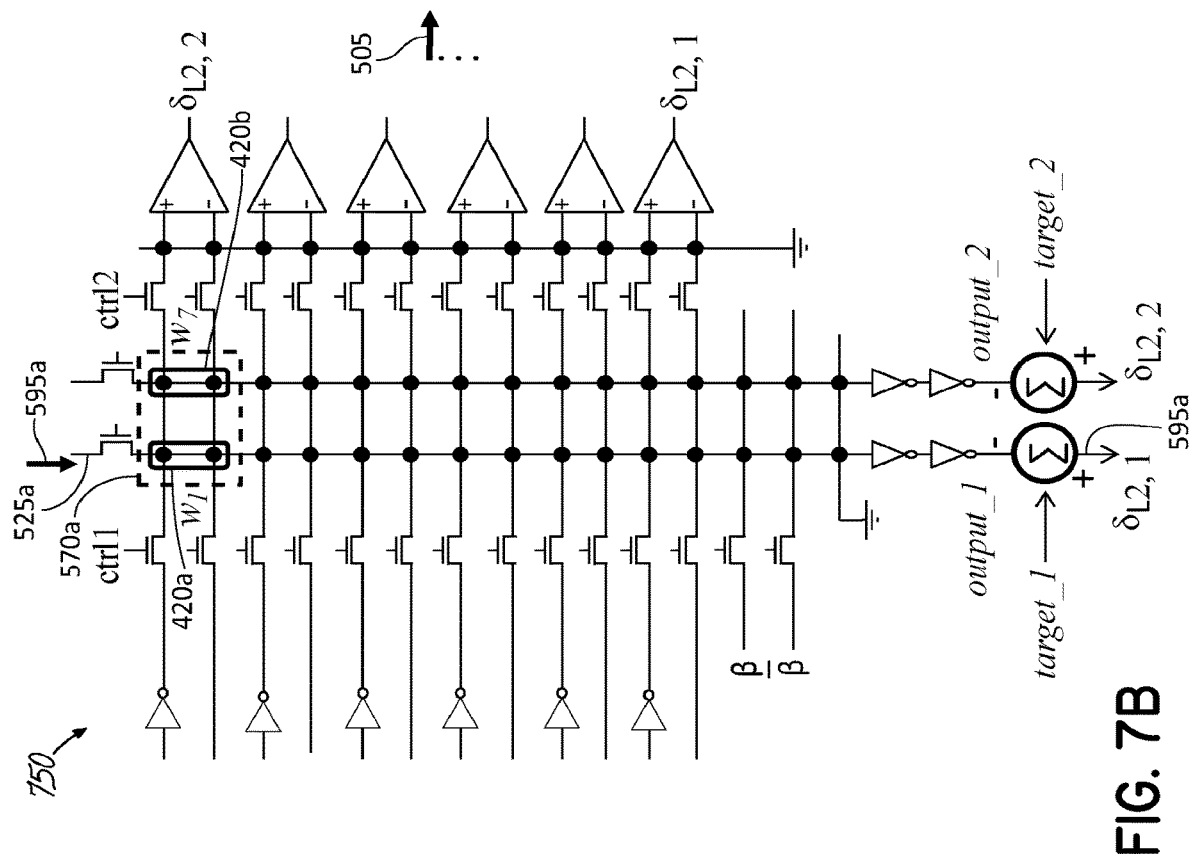
FIG. 7B is a schematic illustration of an exemplary neural network configuration with regards to a horizontal neural network configuration being implemented in the second crossbar configuration in accordance with an embodiment of the disclosure.
Figure 7A:
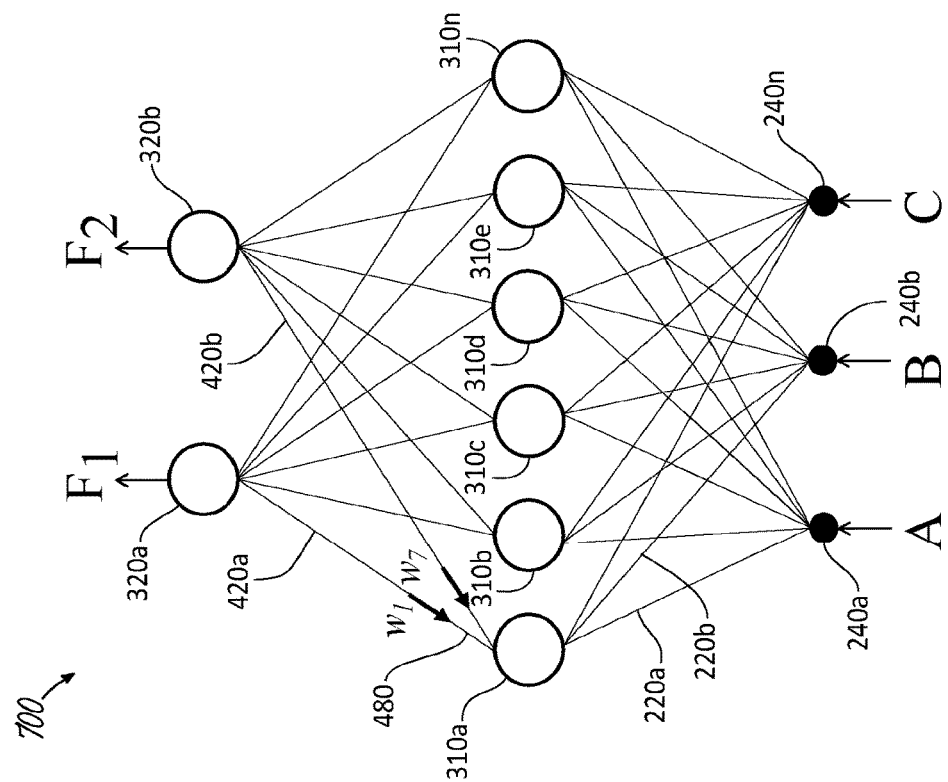
FIG. 7A is a schematic illustration of an exemplary neural network configuration that details how the weights of such an exemplary neural network configuration are propagated back through the neural network configuration when executing a back propagation training algorithm in accordance with an embodiment of the disclosure.

The first error signal 595a may be applied to a vertical input 525a of the second memristor crossbar configuration 650. Referring to FIGS. 7A and 7B, the functionality of the horizontal neural network configuration 570a as discussed in FIG. 5 with regards to the discussion of the neural network configuration 450 as discussed in FIG. 4B is presented in further detail below for clarity. The neural network configuration 700 as presented in FIG. 7A includes similar features as the neural network configuration 450 as presented in FIG. 4B. The second memristor crossbar configuration 750 as presented in FIG. 7B includes similar features as the second memristor crossbar configuration 530 as presented in FIG. 5 in which the functionality of the horizontal neural network configuration 570a is discussed in further detail.

After the first error signal 595a is generated via the vertical neural network configuration 560a, the first error signal 595a is applied to the vertical input 525a of the second memristor crossbar configuration 650 so that the first error signal 595a may be propagated back through the second memristor crossbar configuration 750. This is similar to the error output voltage value of "$F_1$" being applied neuron 320a and propagated back through the neural network configuration 700 as in FIG. 7A. Weights 420(a-b) are then generated for the horizontal neural network configuration 570a that differ from the weights 410(a-n) generated for the vertical neural network configuration 560a due to the different memristors included in the horizontal neural network configuration 570a as compared to the memristors included in the vertical neural network configuration 560a. Weights 420(a-b) as shown in FIG. 7B correspond to the weights 420(a-b) as shown in FIG. 7A as the error output voltage is propagated back through the neural network configurations. The vertical input 525a is the input of the second memristor crossbar configuration 750 that is not coupled to the output of the first memristor crossbar configuration 510 while enabling the first error signal 595a to propagate through each of the horizontal neural network configurations, such as the horizontal neural network configuration 570a. The weights 420(a-b) as shown in FIG. 7B then generate the second output signal 505. Thus, the second output signal 505a may be a direct correlation to the resistance values of the memristors included in the horizontal neural network configuration 570a.

As noted above, the second output signal 505 may then be compared to the input voltage signal 520 to generate the second error signal 535. The second error signal 535 may then be propagated back through the first memristor crossbar configuration 510 as the initial input voltage signal 540. The resistance values of each memristor included in the first memristor crossbar configuration 510 and the second memristor crossbar configuration 530 may be adjusted accordingly so that the first error signal 595(a-b) eventually converges to the desired output signal 590(a-b).

The implementation of the vertical neural network configuration 560a as shown in FIG. 5 and FIG. 6B as well as the horizontal neural network configuration 570a as shown in FIG. 5 and FIG. 7B may significantly decrease the quantity of iterations required for the first error signal 595(a-b) to converge to the desired output signal 590(a-b). The combination of the vertical network configuration 560a with the horizontal network configuration 570a in a single memristor crossbar configuration, such as the second memristor crossbar configuration 530, implements the same memristors for both the generation of the weights 410(a-n) as well as the generation of the weights 420(a-b). Thus, the exercising of different weights, such as weights 410(a-n) and weights 420(a-b), from memristors within a single memristor crossbar configuration may be implemented for both the initial application of voltages to the single memristor crossbar configuration as well as the propagation of the error voltages generated by the second memristor crossbar configuration back through the entire neural network.

The implementation of the a single memristor crossbar configuration for both the initial application of voltages as well as the propagation of error voltages back through the neural network prevents additional memristor crossbar configurations from being implemented into the neural network. Having a memristor crossbar configuration devoted to the application of the initial application of voltages and then another memristor crossbar configuration devoted to the propagation of error voltages back through the neural network compounds the quantity of iterations necessary for the error voltage to converge within a threshold of the desired output voltage exponentially. Additionally, having memristors included in the memristor crossbar configuration devoted to the initial application of voltages as well as memristors included in the memristor crossbar configuration devoted to the propagation of error voltages with similar resistance values is quite difficult. The difference in resistance values has a significant impact on the convergence of the error voltage to the desired output voltage. Implementing the same memristors in a single memristor crossbar configuration for both the application of the initial voltage as well as the propagation of the error signal eliminates any difference in resistance values.

Figure 8A:
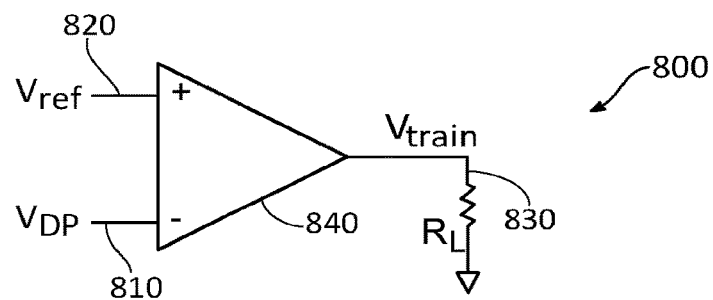
FIG. 8A is a schematic illustration of a resistance adjuster of resistances for memristors included in the first and second crossbar configurations in accordance with an embodiment of the disclosure.

Referring to FIG. 8A, the functionality of training unit 545 and training unit 555 as shown in FIG. 5 is discussed in further detail. The training units 545 and 555 are resistor adjusters that update the resistances of each memristor included in the first crossbar configuration 510 and the second crossbar configuration 530. The training unit 555 compares the first error signal 595 with a reference voltage signal. An example of a reference voltage signal is an error signal generated from a different crossbar configuration. Based on the comparison of the first error signal 595 with the reference voltage signal, the training unit 555 generates a training voltage signal that is then used to update the resistance values of the memristors included in the second crossbar configuration 530. The training unit 545 compares the second output voltage signal 505 with the input voltage signal 520. Based on the comparison of the second output voltage signal 505 with the input voltage signal 520, the training unit 545 updates the resistance values of the memristors included in the first crossbar configuration 510.

FIG. 8A depicts an example resistance adjuster 800. The example resistance adjuster 800 can be implemented for both training units 545 and 555. For example, with regards to training unit 555, input voltage signal 810 is represented by the first error signal 595 which is the difference between the first output voltage signal 580 of the second crossbar configuration 530 and the desired output signal 590. As noted above, the first error signal 595 is then applied to the vertical input 525 of the second crossbar configuration 530 in which the first error signal 595 is then propagated back through the memristors included in the second crossbar configuration 530. The resistance adjusters implemented for training units 545 and 555 may be any type of resistance adjuster that adjusts resistance values associated with resistive memories to decrease the difference between an output voltage signal and a desired signal as will be appreciated by one of ordinary skill in the art.

In an embodiment, the first error signal 595, as represented by the input voltage signal 810 in FIG. 8A, is first compared by comparator 840 to a reference voltage signal 820. The comparator 840 then generates a training voltage signal 830 that may then be applied to the second crossbar configuration 530 to adjust the resistances of the memristors in the second crossbar configuration 530 so that the difference between the first output voltage signal 580 and the desired output signal 590 is decreased. The reference voltage signal 820 may be any type of known voltage signal that when compared with the input voltage signal 810, such as the first error signal 595, an adequate training voltage signal 830 is generated that can be used to adequately adjust the memristors in a crossbar configuration as will be appreciated by one of ordinary skill in the art. For example, the reference voltage signal 820 may be an error signal generated from a different crossbar configuration.

Figure 8B:
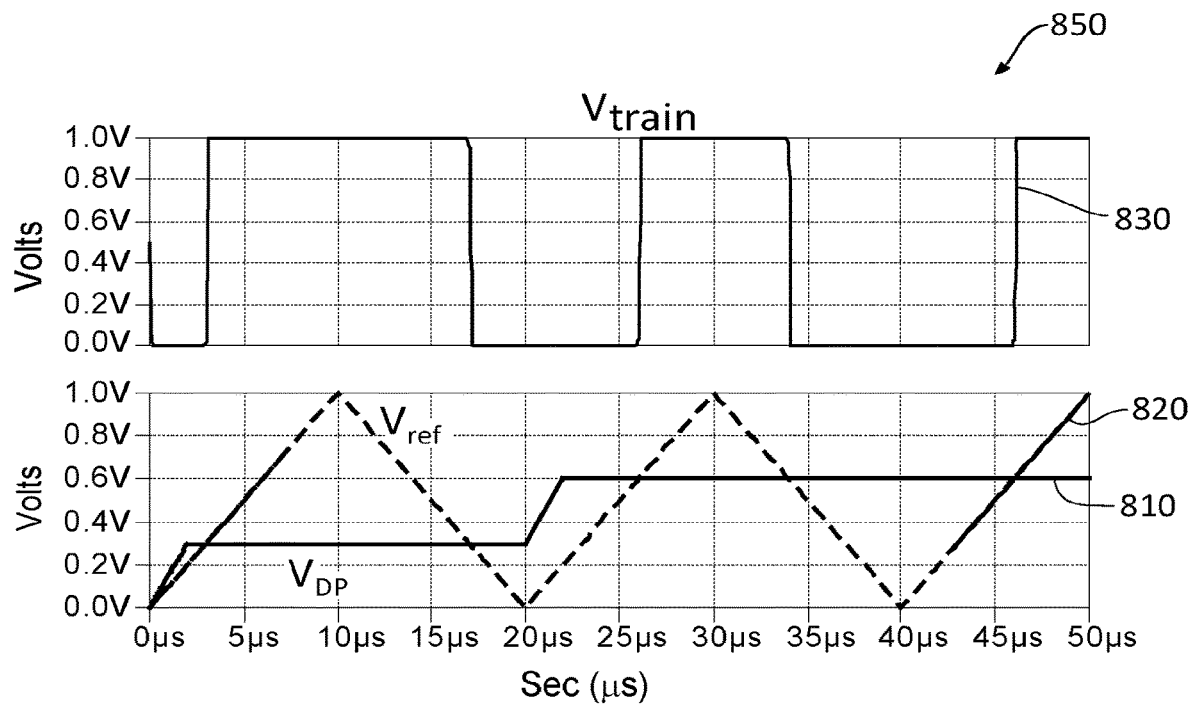
FIG. 8B is a schematic illustration of signal behavior as triggered by the resistance adjuster with regards to a reference voltage signal, an input voltage signal, and a training voltage signal in accordance with an embodiment of the disclosure.

In an embodiment, the reference voltage signal 820 is a digital signal, such as a binary signal and the input voltage signal 810 is a multivalued signal as shown in FIG. 8B. FIG. 8B depicts a signal behavior 850 of the reference voltage signal 820, the input voltage signal 810 and the training voltage signal 830. The comparator 840 may then generate the training voltage signal 830 such that the training voltage signal 830 is a binary signal. The conversion of the training voltage signal 830 to a binary signal by the comparator enables the training voltage signal 830 to be easily transferred to different cores in a multi-core system without the need of digital to analog converters required to convert multivalued signals to binary signals. An example of a core in a multi-core system is the first crossbar configuration 510 as a first core and the second crossbar configuration 530 as the second core. Several additional cores may also be included in the system. The conversion of the training voltage signal 830 to a binary signal enables the training voltage signal 830 to be easily applied as the second error signal 535 to the first crossbar configuration 510 as well as the being easily applied as the first error signal 595 to the second crossbar configuration 530.

The implementation of the resistance adjuster 800 eliminates the need of additional digital to analog converters to be associated with the configuration. The additional digital to analog converters would convert multivalued signals outputted by each of the first and second crossbar configurations to binary signals so that the binary signals could be applied to each of the first and second crossbar configurations. Although more precise than the resistance adjuster 800, the digital to analog converters require additional power and space for the configuration that is not required with the resistance adjuster 800.

In an embodiment, the second output voltage signal 505, as represented by the input voltage signal 810 in FIG. 8B, is first compared by comparator 840 to the input voltage signal 520, as represented by the reference voltage signal 820. The comparator 840 then generates a training voltage signal 830 that may then be applied to the first crossbar configuration 510 to adjust the resistances of the memristors in the first crossbar configuration 510 so that the difference between the first output voltage signal 480 and the desired output signal 590 is decreased.

Referring back to the analog neuromorphic circuit 200 of FIG. 2, both the input and its complemented form are applied to the analog neuromorphic circuit 200. In the analog neuromorphic circuit 200, a complemented input voltage (such as A (bar)) has the same magnitude but opposite polarity as the original input voltage 240(*a-n*) (such as A). For the input voltage pair A in FIG. 2, if $\sigma_{Ai+}$ is higher than $\sigma_{Ai-}$, then the synapse for input voltage A has a positive weight. Likewise if $\sigma_{A+}$ is less than $\sigma_{A-}$, the synapse has a negative weight. This applies to each of the input voltages 240(*a-n*). The output 280 of the comparator 270 at the bottom of the circuit represents the output of the analog neuromorphic circuit 200. The potential at the first comparator input ($DP_j$) is given by $$DP_j = \frac{A(\sigma_{A+} - \sigma_{A-}) + \ldots + \beta(\sigma_{C+} - \sigma_{C-})}{\sigma_{A+} + \sigma_{A+} \ldots + \sigma_{C+} + \sigma_{C-}} \quad (1)$$

where the conductance of the resistive memories 210(*a-n*) of FIG. 2 from top to bottom are $\sigma_{A+}, \sigma_{A-}, \ldots, \sigma_{C+}, \sigma_{C-}$.

Eq. 1 indicates that the analog neuromorphic circuit 200 is essentially carrying out a set of multiply-add operations in parallel in the analog domain. For the analog neuromorphic circuit 200 in FIG. 2, the approximation of the activation function may be executed using a pair of CMOS inverters setting the power rails to $V_{dd}=1V$ and $V_{ss}=-1V$. The analog neuromorphic circuit 200 is essentially providing discrete neuron output of values 1 or −1.

Training of a multi-layer neural network, such as the neural network configuration 500 in FIG. 5, is required in order to obtain the appropriate output such as the identification of a dog when an image of a dog is observed. An example training mechanism for the multi-layer neural network is provided below. However, any other training technique may be implemented as would be appreciated by one skilled in the art.

1) Initialize the resistive memories 210(*a-n*) with random resistances.
2) For each input pattern x provided via initial input voltage signal 540 to the neural network configuration 500:
   i) Apply the input pattern x to the first memristor crossbar configuration 510 and evaluate, record $DP_j$ values and outputs of all neurons (hidden neurons and output neurons).
   ii) For each output layer neuron i, calculate the error, $\delta_i$, between the neuron output ($F_1$) and the target output ($D_i$).

$$\delta_i = \mathrm{sgn}(D_i - F_1) \quad (2)$$

iii) Back propagate the error for each hidden layer neuron j.

$$\delta_j = \mathrm{sgn}(\Sigma_k \delta_k w_{k,j}) \quad (3)$$

where neuron k is connected to the previous layer neuron j.
   iv) Determine the amount, Δw, that each neuron's synapses should be changed ($\eta\pi/2$ is the learning rate):

$$\Delta w_j = \eta \times \delta_j \times g_{th}(DP_j) \times \mathrm{sgn}(x) \quad (4)$$

$$\text{where } g_{th}(x) = \begin{cases} 1 - |x|/2, & |x| < 1.95 \\ 0.05, & \text{else} \end{cases} \quad (5)$$

v) Apply write pulses to the crossbar with pulse widths proportional to $\Delta w_j$ to update the resistive memory conductance.
3) If the error in the output layer has not converged to a sufficiently small value, return to step 2.

The training circuit is able to generate a variable pulse width so that resistive memory conductance may be updated according to the learning rule in Eq. (4). From Eq. (4) and (5) the weight update amount depends inversely on the $DP_j$ value of the corresponding neuron. To determine the $DP_j$ value of a neuron, the crossbar column may be accessed implementing the neuron (input of the inverter pair in the neuron circuit). The $DP_j$ value of the neuron and the updated weights of the neuron may not be accessed at the same time. In this circuit, the value of $DP_j$ may be stored in a capacitor and may be used to determine the desired training pulse width. To reduce the training circuit overhead a single capacitor may be implemented for a layer of neurons and the weights are updated one neuron at a time. The value $DP_j$ for each of the neurons in the crossbar may be connected to the capacitor in the training unit through pass transistors and will be charged as $V_c$. The training unit may access the desired $DP_j$ value by enabling the corresponding pass transistor. For each neuron, the weights may be updated in two steps: increasing and decreasing. During the increasing step, the conductance of the resistive memories 210(*a-n*) that require positive update may be updated. During the decreasing step the conductance of the resistive memories 210(*a-n*) requiring a conductance decrease may be modified.

The circuit in FIG. 8A is essentially a pulse width modulation circuit which may be used to pulse the memristor crossbar during training. The term $\eta \times g_{th}(DP_j)$ in the training rule (Eq. (4)) is implemented using the voltage single $V_{ref}$ which is a triangular wave. The term $\eta$ may determine the slope and duration of the triangular pulse. Here $V_{op}$ is equal to $V_{DD}$ when $V_{ref} > V_c$, otherwise $V_{op}$ is equal to $V_{SS}$. From FIG. 8A, the smaller a $V_c$ generates longer pulse and vice versa.

It is to be appreciated that the Detailed Description section, and not the Abstract section, is intended to be used to interpret the claims. The Abstract section can set forth one or more, but not all exemplary embodiments, of the present disclosure, and thus, is not intended to limit the present disclosure and the appended claims in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in art. The invention in its broader aspects is therefore not limited to the specific details, representative apparatus and method and illustrative examples shown and described. Accordingly, departures may be made from such details without departing from the scope of the general inventive concept.

What is claimed is:

1. An analog neuromorphic circuit that implements a plurality of resistive memories, comprising:
   a first memristor crossbar configuration that includes a first plurality of resistive memories that is configured to provide a resistance to a first input voltage signal as the first input voltage signal propagates through the first memristor crossbar configuration generating a second input voltage signal;
   a second memristor crossbar configuration that includes a second plurality of resistive memories that is configured to provide a resistance to the second input voltage signal and a first error signal as the second input voltage signal and the first error signal propagate through the second memristor crossbar configuration generating a first output voltage signal and a second output voltage signal;
   a first training unit that is configured to adjust a second plurality of weights associated with the second memristor crossbar configuration to decrease a difference between the first output voltage signal and a desired output signal as the first error signal and the first output voltage signal propagate through the second memristor crossbar configuration; and
   a second training unit that is configured to adjust a first plurality of weights associated with the first memristor crossbar configuration to decrease a difference between the second output voltage signal and the input voltage signal as a second error signal propagates through the first memristor crossbar configuration as the input voltage signal, wherein the first error signal and the second error signal are adjusted to decrease the difference between the first output voltage signal and the desired output signal based on the adjusted first plurality of weights and the second plurality of weights.

2. The analog neuromorphic circuit of claim 1, wherein the first training unit is further configured to adjust a resistance value that corresponds to each resistive memory included in the second memristor crossbar configuration in adjusting the second plurality of weights associated with the second memristor crossbar configuration to decrease the difference between the first output voltage signal and the desired output signal as the first error signal and the first output voltage signal propagate through the second memristor crossbar configuration.

3. The analog neuromorphic circuit of claim 2, wherein the second training unit is further configured to adjust a resistance value that corresponds to each resistive memory included in the first memristor crossbar configuration in adjusting the first plurality of weights associated with the first memristor crossbar configuration to decrease the difference between the second output voltage signal and the input voltage signal as the second error signal propagates through the first memristor crossbar configuration as the input voltage signal.

4. The analog neuromorphic circuit of claim 3, wherein the first error signal and the second error signal are adjusted for the first output voltage signal to converge to the desired output signal based on the adjusted resistance values of the first plurality of resistive memories and the adjusted resistance values of the second plurality of resistive memories.

5. The analog neuromorphic circuit of claim 1, further comprising:
   a first comparator included in the first training unit and configured to:
      compare the first output voltage signal to the desired output signal, wherein the desired output voltage signal is at a signal level that the first output voltage signal is desired to be within a threshold of the signal level,
      generate the first error signal that is representative of a difference between the first output voltage signal and the desired output signal,
      provide the first error signal so that the first error signal propagates back through the second memristor crossbar configuration, and
      adjust a resistance value associated with each resistive memory included in the second memristor crossbar configuration based on the first error signal to decrease the difference between the first output voltage signal and the desired output signal.

6. The analog neuromorphic circuit of claim 1, further comprising:
a second comparator included in the second training unit and configured to:
compare the second output voltage signal to the input voltage signal,
generate a second error signal that is representative of a difference between the second output voltage signal and the input voltage signal,
provide the second error signal as the input voltage signal to the first memristor crossbar configuration, and
adjust a resistance value associated with each resistive memory included in the first memristor crossbar configuration based on the second error signal to decrease the difference between the second output voltage signal and the input voltage signal.

7. The analog neuromorphic circuit of claim 1, wherein the second memristor crossbar configuration includes the second plurality of resistive memories that is arranged in a grid configuration that includes at least two rows and at least two columns of resistive memories so that each column of resistive memories is grouped as a vertical neuron configuration and each set of two rows of resistive memories is grouped as a horizontal neuron configuration.

8. The analog neuromorphic circuit of claim 7, wherein the input voltage signal is propagated through each vertical neuron configuration of the second memristor crossbar configuration so that each resistance of each resistive memory from the second plurality of resistive memories included in each of the vertical neuron configurations contributes to the generation of the first output voltage signal.

9. The analog neuromorphic circuit of claim 8, wherein the first error signal is propagated back through each horizontal neuron configuration of the second memristor crossbar configuration so that each resistance of each resistive memory from the second plurality of resistive memories included in each of the horizontal neuron configurations contributes to the generation of the second output voltage signal.

10. The analog neuromorphic circuit of claim 9, wherein the propagation of the input voltage signal through each of the vertical neuron configurations to generate the first output voltage signal and the propagation of the first error signal back through each of the horizontal neuron configurations to generate the second output voltage signal is executed without additional resistive memories associated with additional analog neuromorphic circuits.

11. A method of adjusting resistances of a plurality of resistive memories to train an analog neuromorphic circuit to generate a desired output, comprising:
providing a resistance by a first plurality of resistive memories to a first input voltage signal as the first input voltage signal propagates through a first memristor crossbar configuration generating a second input voltage signal;
providing a resistance by a second plurality of resistive memories to the second input voltage signal and a first error signal as the second input voltage signal and the first error signal propagate through a second memristor crossbar configuration generating a first output voltage signal and a second output voltage signal;
adjusting a second plurality of weights associated with the second memristor crossbar configuration to decrease a difference between the first output voltage signal and a desired output signal as the first error signal and the first output voltage signal propagate through the second memristor crossbar configuration; and
adjusting a first plurality of weights associated with the first memristor crossbar configuration to decrease a difference between the second output voltage signal and the input voltage signal as a second error signal propagates through the first memristor crossbar configuration as the input voltage signal, wherein the first error signal and the second error signal are adjusted to decrease the difference between the first output voltage signal and the desired output signal based on the adjusted first plurality of weights and the second plurality of weights.

12. The method of claim 11, wherein the adjusting of the second plurality of weights comprises:
adjusting a resistance value that corresponds to each resistive memory included in the second memristor crossbar configuration in adjusting the second plurality of weights associated with the second memristor crossbar configuration to decrease the difference between the first output voltage signal and the desired output signal as the first error signal and the first output voltage signal propagate through the second memristor crossbar configuration.

13. The method of claim 12, wherein the adjusting of the first plurality of weights comprises:
adjusting a resistance value that corresponds to each resistive memory included in the first memristor crossbar configuration in adjusting the first plurality of weights associated with the first memristor crossbar configuration to decrease the difference between the second output voltage signal and the input voltage signal as the second error signal propagates through the first memristor crossbar configuration as the input voltage signal.

14. The method of claim 13, further comprising:
adjusting the first error signal and the second error signal for the first output voltage signal to converge to the desired output signal based on the adjusted resistance values of the first plurality of resistive memories and the adjusted resistive values of the second plurality of resistive memories.

15. The method of claim 11, further comprising:
comparing the first output voltage signal to the desired output signal, wherein the desired output signal is at a signal level that the first output voltage signal is desired to be within a threshold of the signal level;
generating the first error signal that is representative of a difference between the first output voltage signal and the desired output signal;
providing the first error signal so that the first error signal propagates back through the second memristor crossbar configuration; and
adjusting a resistance value associated with each resistive memory included in the second memristor crossbar configuration based on the first error signal to decrease the difference between the first output voltage signal and the desired output voltage signal.

16. The method of claim 11, further comprising:
comparing the second output voltage signal to the input voltage signal;
generating a second error signal that is representative of a difference between the second output voltage signal and the input voltage signal;
providing the second error signal as the input voltage signal to the first memristor crossbar configuration; and adjusting a resistance value associated with each resistive memory included in the first memristor crossbar configuration based on the second error signal to decrease the difference between the second output voltage signal and the input voltage signal.

17. The method of claim 11, further comprising:
arranging the second plurality of resistive memories in a grid configuration that includes at least two rows and at least two columns of resistive memories so that each column of resistive memories is grouped as a vertical neuron configuration and each set of two rows of resistive memories is grouped as a horizontal neuron configuration.

18. The method of claim 17, further comprising:
propagating back the input voltage signal through each vertical neuron configuration of the second memristor crossbar configuration so that each resistance of each resistive memory from the second plurality of resistive memories included in each of the vertical neuron configurations contributes to the generation of the first output voltage signal.

19. The method of claim 18, further comprising:
propagating back the first error signal back through each horizontal neuron configuration of the second memristor crossbar configuration so that each resistance of each resistive memory from the second plurality of resistive memories included in each of the horizontal neuron configurations contributes to the generation of the second output voltage signal.

20. The method of claim 19, further comprising:
executing the propagation of the input voltage signal through each of the vertical neuron configurations to generate the first output voltage signal and the propagation of the first error signal back through each of the horizontal neuron configurations to generate the second output voltage signal is executed without additional resistive memories associated with additional analog neuromorphic circuits.

* * * * *